United States Patent [19]

Klees

[11] Patent Number: 5,594,514
[45] Date of Patent: Jan. 14, 1997

[54] IMAGE CAPTURE SYSTEM

[75] Inventor: Kevin J. Klees, Rochester, N.Y.

[73] Assignee: Eastman Kodak Company, Rochester, N.Y.

[21] Appl. No.: 355,721

[22] Filed: Dec. 14, 1994

[51] Int. Cl.⁶ .................................................. G03B 29/00
[52] U.S. Cl. ............................ 396/429; 355/20; 358/302; 386/130
[58] Field of Search ............................. 354/75, 76, 105, 354/106, 109, 290; 355/20; 358/296, 301, 302, 342, 345

[56] References Cited

U.S. PATENT DOCUMENTS

| | | | |
|---|---|---|---|
| 3,864,708 | 2/1975 | Allen | 354/290 |
| 4,511,245 | 4/1985 | Luscher | 354/109 X |
| 4,629,300 | 12/1986 | Akimoto et al. | 354/76 |
| 4,673,269 | 6/1987 | Schiff et al. | 354/76 |
| 4,688,105 | 8/1987 | Bloch et al. | 358/335 |
| 4,769,715 | 9/1988 | Feldman et al. | 358/244 |
| 4,789,907 | 12/1988 | Fischetti et al. | 360/33.1 |
| 4,799,072 | 1/1989 | Akimoto et al. | 354/76 |
| 4,891,660 | 1/1990 | Biondo, Jr. | 354/412 |
| 4,922,285 | 5/1990 | Torisawa et al. | 355/20 |
| 4,933,773 | 6/1990 | Shiota et al. | 358/302 |
| 4,947,197 | 8/1990 | Smart et al. | 354/214 |
| 4,965,600 | 10/1990 | Smart et al. | 354/212 |
| 5,155,513 | 10/1992 | Matsumura et al. | 354/106 |
| 5,210,603 | 5/1993 | Sabin | 358/93 |

Primary Examiner—Howard B. Blankenship
Attorney, Agent, or Firm—Peter J. Bilinski

[57] ABSTRACT

An image capture system intended to provide an image capturing device for use by the general public at sites having objects of interest. The image capture system is designed to accept a user's image recording medium and allow the user to capture on the user's image recording medium either a real image or a stored image of the object of interest. The system generally includes an objective lens, a viewing screen, a compartment for receiving an image recording medium, a memory device to store a stored image, a display device to display the stored image capable of being capture on the image recording medium, a projection device for projecting the stored image onto the image recording medium, and a control mechanism to control the operation of the memory device, the display device and the projection device.

11 Claims, 6 Drawing Sheets

IMAGE CAPTURE SYSTEM

CROSS REFERENCE TO RELATED APPLICATIONS

Reference is made to commonly assigned application Ser. No. 08/356,027 entitled STORED IMAGE CAPTURE SYSTEM, in the name of Kevin J. Klees and filed on even date herewith.

FIELD OF THE INVENTION

This invention relates to image capture systems for use by the general public which provide the user the option of capturing on the user's image recording medium a real or stored image.

BACKGROUND OF THE INVENTION

Photographic systems available for general public use are primarily for quick, on-site portraits of the user or other persons. For example, the known art includes coin operated finishing booths having a fixed lens camera which takes a series of exposures of one or more individuals sitting in the booth. Soon after the exposures have taken place, the exposed film is developed and the corresponding photographs are dispensed to the user.

Variations on known finishing booths are also known. For example, U.S. Pat. No. 3,864,708 by Allen, issued Feb. 4, 1975, discloses a coin operated photographic apparatus for automatically photographing a person in a cubicle having a background scene from the city where the cubicle is located and dispensing the photographs in postcard form suitable for mail delivery.

Photographic systems for portrait photography which do not require the use of a cubicle are also known. For example, U.S. Pat. No. 4,891,660 by Biondo, Jr., assigned to PVI, Inc., issued Jan. 2, 1990, discloses a housing, a camera having self developing film capabilities mounted within the housing, and electrical circuits for positioning the person being photographed. The system disclosed by Biondo is adaptable for mounting on top of a display stand which can be used to display items for retail sale.

Finishing booths offering the user a selection of images as background for the person or persons being photographed are also known. For example, in U.S. Pat. No. 3,864,708 issued to Allen, the background scene is from the city in which the finishing booth is located. U.S. Pat. No. 4,688,105 by Bloch et. al., issued Aug. 18, 1987, discloses a video recording booth for self-service production of vended video cassette recordings to a user wherein the user preselects, among other things, the background.

These systems are used for portrait related photography where the resulting photograph (or video cassette) is dispensed at the finishing booth soon after the photograph (or video) is made. These systems are not adaptable to accepting a user's photographic film or transferring high quality images onto the user's photographic film. Further, these systems are usually found in shopping malls or supermarkets and are not adaptable to being located outside at or near objects of interest. As a result, the general public has been left with the costly and bothersome alternative of purchasing slides of the object of interest, usually at gift shops at or near the site of the object of interest, and converting the purchased slides to photographs.

In view of the deficiencies of known systems, it would be desirable to provide an image capture system for use by the general public where the system accepts the user's image recording medium, such as photographic film. It would be advantageous if the system is available for public use at geographic locations having objects of interest. It would be advantageous if the system allows the user to capture on the user's image recording medium either a real image of the object of interest or a stored image of the object of interest previously captured, for example, under optimal weather and lighting conditions. For example, the system could allow a user to preview one or more stored images of the object of interest captured under varying weather and lighting conditions, select one of the stored images previewed and capture the selected stored image on the user's image recording medium. It would be desirable to provide an image capture system which allows a user to use a portion of their image recording medium, remove the image recording medium and use the unused portion in another image capture system or photographic system, such as the user's own camera.

SUMMARY OF THE INVENTION

The image capture system is designed to accept a user's image recording medium, such as photographic film or an electronic image recording medium, and allow the user to capture on the user's image recording medium an image of the object of interest (e.g. Niagara Falls), under current weather and/or lighting conditions or captured previously and stored in the system's memory. For example, if an image capture system of the present invention were located at Niagara Falls, a user would load the system with their photographic film and elect to either photograph Niagara Falls under current weather and lighting conditions (i.e. a real image) or transfer onto the user's film an image of Niagara Falls previously taken in optimal weather and/or lighting conditions (i.e. a stored image). Preferably, the image capture system of the present invention is available for use by the general public, and more preferably, for use by the general public at sites having objects of interest, for example Niagara Falls. It should be appreciated that the image capture system of the present invention can be adapted to use any image capturing technique, including known chemical and electronic techniques, as well as techniques developed in the future.

Preferably, the image capture system is adaptable to receive 35mm photographic film which is commonly used in known cameras. Preferably, the image capture system of the present invention also has a mid-roll interrupt feature. For example, an image capture system having a mid-roll interrupt feature would allow the user to expose several frames of their photographic film, remove the film, and load the same film in another image capture system, or a photographic system, such as the user's own camera, having the mid-roll interrupt feature. Once the film is loaded, the system having the mid-roll interrupt feature can automatically advance the film to the next usable frame.

Offering an image capture system at a fixed location provides the user with an optimal location for capturing an image of the object of interest with excellent composition. Preferably, the image capture system automatically determines the optimal lens focal length and exposure time according to the weather and lighting conditions at the time the user initiates an image capture action. Automating the image capture system allows the user to capture a real or stored image by simply loading the user's image recording medium, selecting an image and initiating an image capture action.

The image capture system's ability to capture a stored image allows the user to capture an image of the object of interest regardless of weather or lighting conditions at the time the user is visiting the object of interest. It also allows the user to capture an image of the object of interest at optimal angles and having excellent composition. Preferably, the image capture system of the present invention offers the user the option of capturing one or more stored images of the object of interest previously captured in varying weather and/or lighting conditions and/or at varying angles and compositions. Additionally, the system can offer the user the option of capturing other stored images, related or unrelated to the object of interest, e.g. a stored image of the Grand Canyon available for capture using a system located at Niagara Falls.

DETAILED DESCRIPTION

Figure 1:
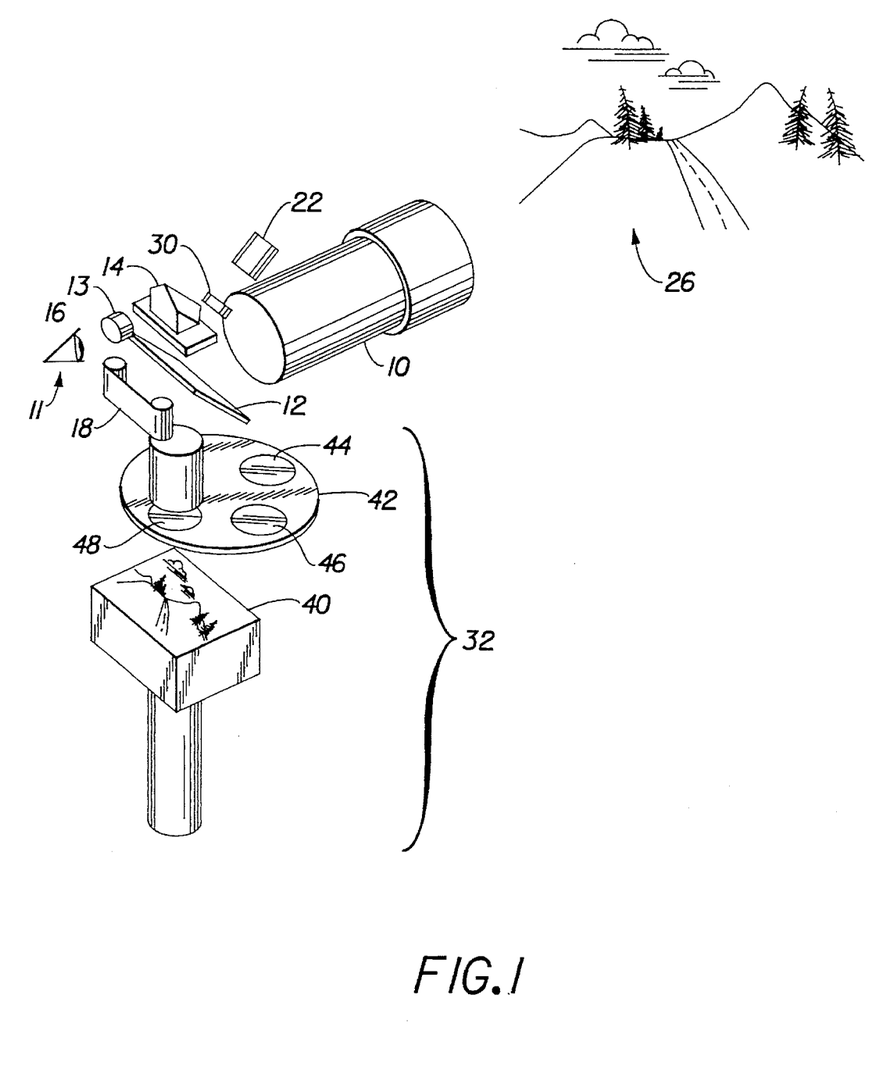
FIG. 1 is a perspective view of an image capture system according to the present invention without enclosures or supports.

Referring now to the drawings, and FIG. 1 specifically, one embodiment of the image capture system of the present invention is shown without enclosures or supports. The system generally includes an objective lens 10, a tilting mirror 12, a viewing screen 13, a roof pentaprism 14, an eye piece lens 16, and a compartment (not shown) for receiving an image recording medium 18; and a memory device (not shown) to store a stored image, a display device 22 to display the stored image for viewing by a user 11, a relay lens 30 for focusing the display of the display device 22; and a projection device 32 to project a stored image onto the image recording medium 18 for capture thereon; and a control mechanism (not shown) to control the operation of the memory device (not shown), the display device 22 and the projection device 32. As shown in FIG. 1, the projection device 32 includes a monochrome CRT 40, a relay lens 34 and a filter wheel 42 having a red filter 44, a blue filter 46 and a green filter 48.

Preferably, the system is used by the general public, and more preferably used by the general public at sites having objects of interest 26, such as Niagara Falls. For example, a stored image capture system of the present invention can be positioned at or near publicly accessible locations providing views of Niagara Falls or the Grand Canyon. In this circumstance, a member of the general public (i.e. a user) could approach the system, load the system with their photographic film and elect to photograph Niagara Falls under real time weather or lighting conditions (i.e. a real image) or transfer onto their film an image of Niagara Falls previously photographed, for example, under optimal weather and/or lighting conditions (i.e. a stored image).

Preferably, the image capture system is adaptable to receive the user's image recording medium (e.g. photographic film or electronic image recording medium). More preferably, the system accepts 35mm photographic film. It should be appreciated that the stored image capture system of the present invention can be adapted to use any image capturing technique, including known chemical and electronic techniques, as well as techniques developed in the future.

A user can be instructed regarding the system's operation by known means, including printed matter and/or interactive user interfaces such as visual and/or audible aids, for example, liquid crystal displays, cathode ray tubes ("CRT") and/or voice synthesizers. Preferably, a display device in close proximity to the system is used to visually instruct the user on the system's operation. For example, when a user first approaches a system, a display device can instruct the user on loading the system with the user's photographic film. Once loaded, the display device can instruct the user on the system's other operations, including viewing a real image, capturing a real image, viewing a stored image, capturing a stored image and returning the user's image recording medium.

Preferably, after loading the image recording medium 18, the system automatically positions the image recording medium 18 for capturing images. For example, if the user loads the system with a new roll of photographic film, the system automatically advances the film to the first frame. Preferably, the image capture system employs a mid-roll interrupt feature as described in U.S. Pat. No. 4,965,600 by Smart et. al., assigned to Eastman Kodak Company, issued Oct. 23, 1990; and U.S. Pat. No. 4,947,197 by Smart et. al., assigned to Eastman Kodak Co, issued Aug. 7, 1990. A system having a mid-roll interrupt feature allows the user to capture several images, remove the image recording medium 18, and use the unused portion of the image recording medium 18 in another system having the mid-roll interrupt feature.

One operation of the image capture system is displaying for the user's viewing a real image capable of being captured on the user's image recording medium 18. Another operation of the system is capturing a real image on the user's image recording medium 18. A further operation of the system is displaying for the user's viewing a stored image capable of being captured on the user's image recording medium 18. Preferably, the system displays one or more stored images showing the object of interest, or other objects, in varying weather and/or lighting conditions and at varying angles and/or compositions. Another operation of the system is capturing a stored image on the user's image recording medium 18.

It should be appreciated that the system of the present invention is not limited to having a specific operation of displaying a stored image. Displaying images can be accomplished in many ways. For example, the user can be presented with printed matter and/or a cathode ray tube ("CRT") displaying a stored image capable of being captured on the user's image recording medium 18. In this circumstance, the printed matter and/or CRT is positioned in close proximity to the image capture system. In the preferred embodiment, where multiple stored images are available for capture, the printed matter and/or CRT would display multiple stored images with a related identifying code which would be entered by the user prior to the user capturing the selected stored image.

Figure 2:
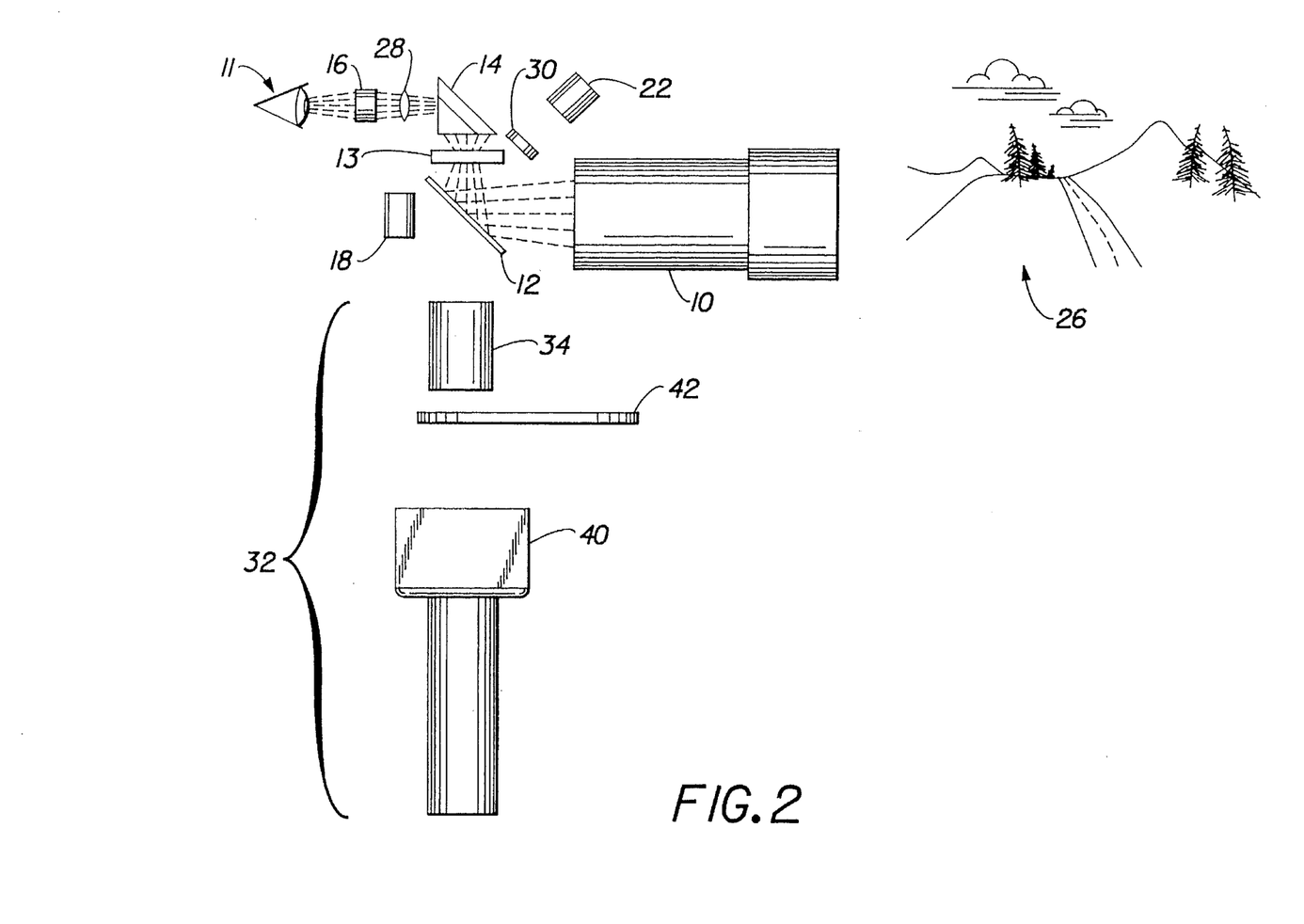
FIG. 2 is a side view of an image capture system according to the present invention without enclosures or supports, displaying a real image.

Referring to FIG. 2, one embodiment of the system of the present invention is shown without enclosures or supports. The system is shown displaying a real image of the object of interest 26 capable of being captured on the user's image recording medium 18. In one embodiment of the invention, the real image is viewable through an eye piece lens 16. With reference to FIG. 2, an optic ray bundle 28 illustrates the path of the real image viewable through the eye piece lens 16. Specifically, an objective lens 10 focuses a real image on a viewing screen 13 via a tilting mirror 12, which is shown in the "DOWN" position. The viewing screen 13 projects the real image to a roof pentaprism 14 for viewing by the user 11 via an eye piece lens 16. Preferably, the objective lens 10 is automatically set to the largest aperture to allow maximum light for viewing the real image.

Preferably, the system initially displays a real image of the object of interest 26. For example, when the user first approaches a system and looks into the eye piece lens 16, the user 11 will see a display of the real image capable of being captured on the user's image recording medium 18. Preferably, a system automatically determines appropriate lens aperture setting and shutter speed according to current weather and light conditions. Thus, in the preferred embodiment, a user would approach a system, load the user's image recording medium 18, view a real image of the object of interest 26 and, if desired, capture the real image onto the user's image recording medium 18. Alternatively, a system can be adapted to allow a user to compose the real image according to the user's preference and/or to control the aperture setting and/or shutter speed before capturing the real image.

Figure 3:
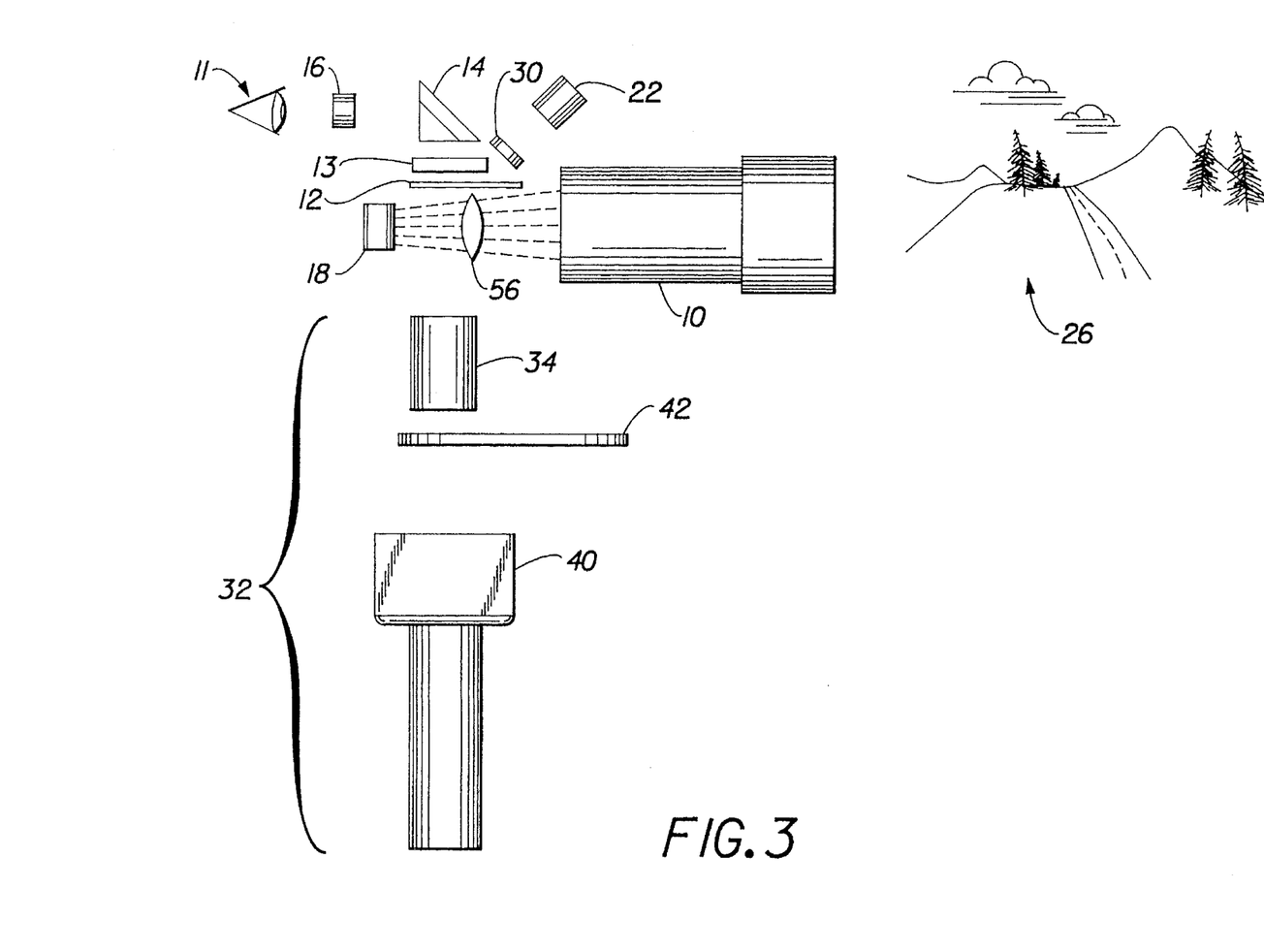
FIG. 3 is a side view of an image capture system according to the present invention without enclosures or supports, capturing a real image.

With reference to FIG. 3, one embodiment of the system of the present invention is shown without enclosures or supports. The system is shown capturing a real image of the object of interest 26 onto the user's image recording medium 18. After the composition, lens aperture setting and shutter speed have been determined, a user can elect to capture a real image on the user's image recording medium 18 by initiating an image capture action which can occur, for example, by pressing a shutter release button (not shown). When initiated, the objective lens 10 is automatically stopped down to the predetermined aperture, the tilting mirror 12 moves to the "UP" position and a focal plane shutter (not shown), located directly in front of the image recording medium 18, opens for the predetermined time. The optic ray bundle 56 shows the real image path to the image recording medium 18. Preferably, the user's image recording medium 18 is advanced to the next usable portion after the image capture action is completed.

Preferably, the tilting mirror 12 blocks out any light from the eye piece lens 16 when the tilting mirror 12 is in the "UP" position. More preferably, the perimeter of the top surface of the tilting mirror 12 rests on a light tight soft gasket (not shown) to prevent stray light from the eye piece lens 16 from affecting the integrity of the image capture action. Preferably, the system returns to displaying a real image after the image capture is completed. In this regard, the tilting mirror 12 returns to the "DOWN" position and the objective lens 10 is automatically returned to the largest aperture.

Figure 4:
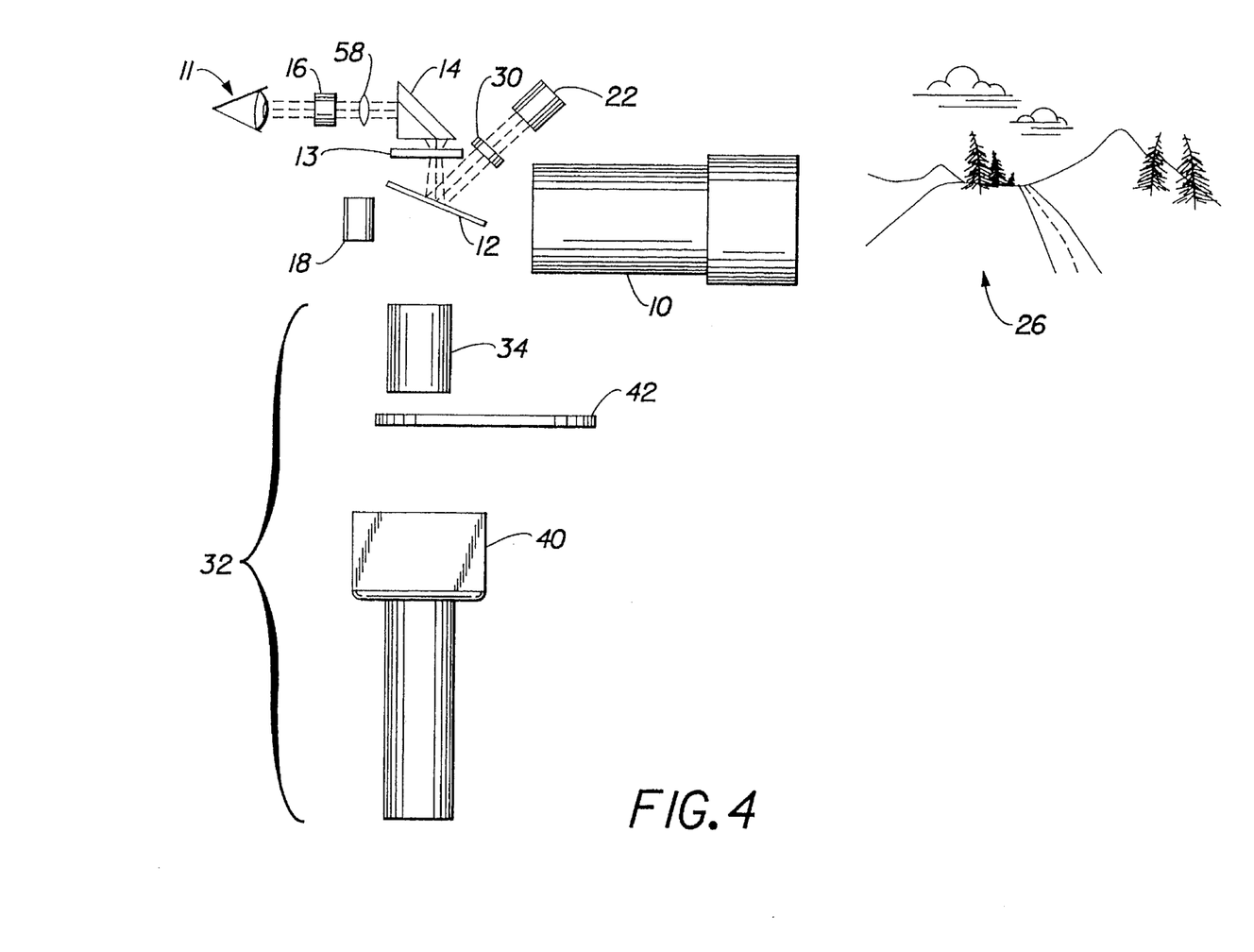
FIG. 4 is a side view of an image capture system according to the present invention without enclosures or supports, displaying a stored image.

With reference to FIG. 4, one embodiment of the system of the present invention is shown without enclosures or supports. The system shown is displaying a stored image of an object of interest. Preferably, a stored image of an object of interest 26 located at the system's site is shown. In one embodiment of the invention, the system includes a memory device (not shown) for storing an image, a display device 22 for displaying the stored image, and a control mechanism (not shown) for retrieving the stored image from the memory device (not shown) and transferring the stored image to the display device 22 for display. Preferably, the memory device (not shown) stores an image in digital form. More preferably, the memory device (not shown) is an optical disc and optical disc reader similar to those known in the art. Preferably, the control mechanism (not shown) is a programmable microprocessor similar to ones known in the art. More preferably, the control mechanism (not shown) is a computer.

Preferably, the display from a display device 22 is viewable through an eye piece lens 16. As shown by the optic ray bundle 58 in FIG. 4, a display device 22 displays the stored image through a relay lens 30 which focuses the stored image on a viewing screen 13 via the tilting mirror 12, which is shown in the "MIDDLE" position. The viewing screen 13 projects the stored image to a roof pentaprism 14 for viewing by the user 11 via the eye piece lens 16. The positioning of the tilting mirror 12 in the "MIDDLE" position is dependent on the angular position of the display device 22. Preferably, the display device 22 is a color CRT. More preferably, the display device 22 has a resolution of about 256×400 or higher. Preferably, the objective lens 10 is stopped down to the smallest aperture to block all light from the objective lens 10 which would otherwise be projected on the tilting mirror 12. Preferably, the image capture system initiates displaying a stored image in response to user command. For example, as discussed above, when a user approaches a system, the system is preferably displaying a real image. In this circumstance, the system can be adapted to receive a user initiated input from a user interface (not shown), to discontinue displaying the real image and to display a stored image. If initiated, the control mechanism (not shown) retrieves the stored image from the memory device (not shown) and transfers the stored image to the display device 22. The display device 22 displays the stored image through a relay lens 30 which focuses the stored image on a viewing screen 13 via a tilting mirror 12 in the "MIDDLE" position. The viewing screen 13 projects the stored image to the roof pentaprism 14 which enables the user 11 to view the stored image via an eye piece lens 16. At this point, the user has the option of either initiating an image capture action on the displayed stored image, viewing a different stored image (if multiple stored images are available), or returning the system to displaying a real image. If the user elects to display a different image (real or stored), the user can initiate display of the image by using a user interface (not shown), preferably the same user interface used to initiate the display of the stored image.

In the preferred embodiment where multiple stored images are available for display, the system is adapted to receive a user command to display another stored image. Preferably, the user command is received by a user interface (not shown). Upon receipt, the control mechanism (not shown) would retrieve another stored image from the memory device (not shown) and transfer the stored image to the display device 22 for display and viewing by the user 11 as described in detail above. Preferably, the user is able to repeatedly command display of different stored images until the desired stored image is displayed.

Figure 5:
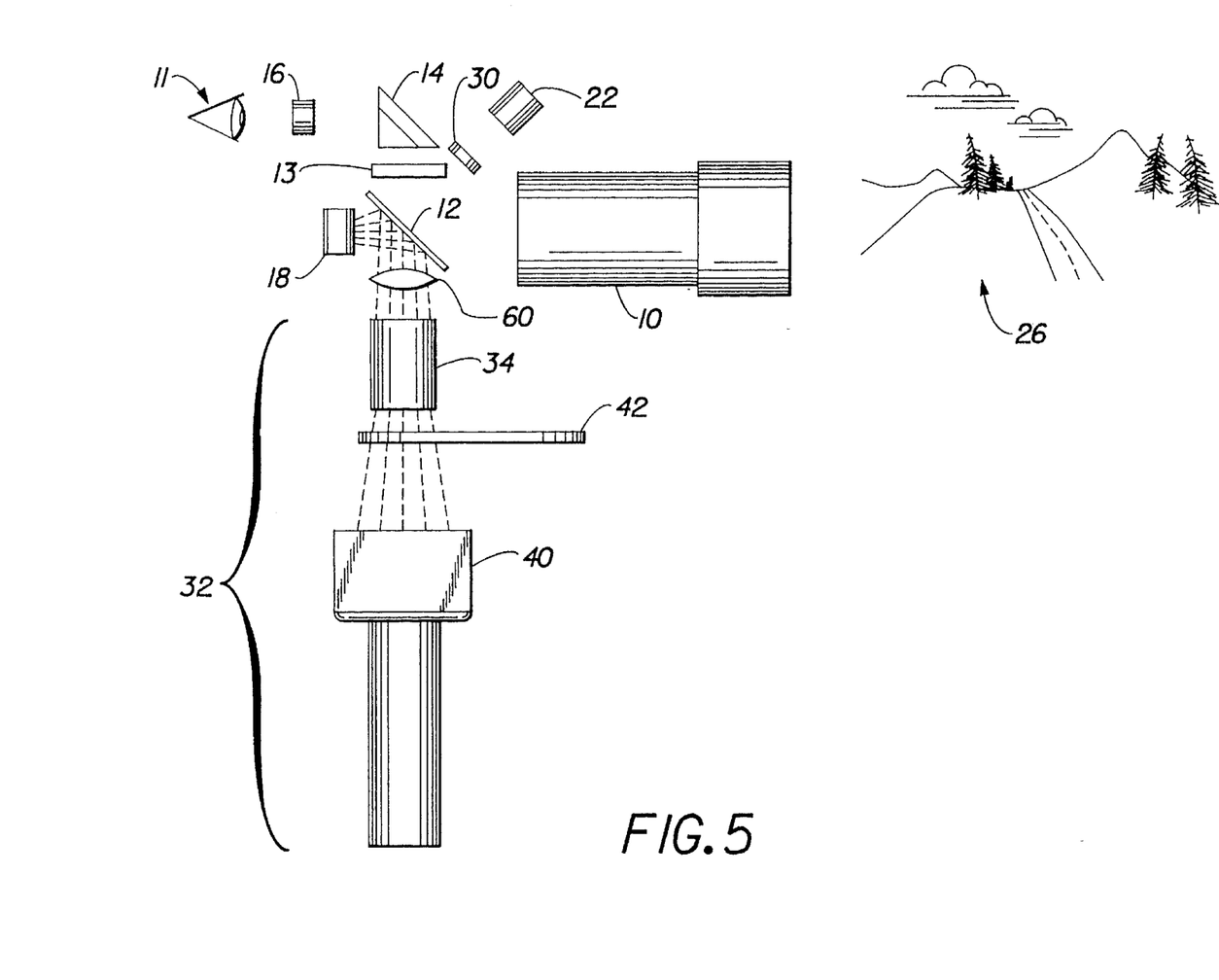
FIG. 5 is a side view of an image capture system according to the present invention without enclosures or supports, capturing a stored image.

With reference to FIG. 5, one embodiment of the system of the present invention is shown without enclosures or supports. The system is shown capturing a stored image. In one embodiment of the invention, the image capture system includes a projection device 32 for projecting a stored image for capture on the user's image recording medium 18. Preferably, the projection device 32 includes a CRT which displays the stored image at a resolution of at least 512×512. More preferably, the projection device 32 includes a monochrome CRT 40, and a color filter wheel 42 similar to those known in the art.

After viewing the stored image or stored images, if multiple stored images are available for viewing, a user can elect to capture the displayed stored image by initiating an image capture action which can occur, for example, by pressing the shutter release button (not shown). When initiated, the projection device 32 projects the stored image onto the image recording medium 18. Preferably, as shown by the optic ray bundle 60 in FIG. 5, the projection device 32 projects the stored image onto a tilting mirror 12, which is moved to a position which reflects the stored image onto the image recording medium 18. Preferably, the tilting mirror 12 is a double sided mirror, thus the tilting mirror 12 can be positioned in the "DOWN" position to reflect the image from the projection device 32 onto the image recording medium 18. When the tilting mirror 12 is in the "DOWN" position, the tilting mirror 12 blocks out any light from the objective lens 10. Preferably, the perimeter of the bottom surface of the tilting mirror 12 rests on a light tight soft gasket (not shown) to prevent stray light from the objective lens 10 from affecting the integrity of the image capture action.

In one embodiment of the invention, the image capture action includes processing the stored image into a plurality of color separations and sequentially projecting each color separation through a corresponding color filter and onto a tilting mirror 12 in the "DOWN" position. The image recording medium 18 is exposed to each filtered color separation for an appropriate time. An appropriate exposure time is accomplished by either enabling and blanking the projection of the filtered color separation and/or opening and closing the focal plane shutter (not shown) located in front of the image recording medium 18.

With specific reference to FIGS. 1 and 5, preferably, the stored image is processed into red, green and blue color separations and a corresponding red filter 44, blue filter 46 and green filter 48 are used. For example, when image capture action is initiated, the control mechanism (not shown) retrieves the stored image being displayed for the user's 11 viewing from the memory device (not shown), processes the stored image into a green color separation and projects the processed green image on a monochrome CRT 40. The processed green image is projected through a green filter 48 on a filter wheel 42, through a relay lens 34 which focuses the processed green image onto the tilting mirror 12 in the "DOWN" position. The tilting mirror 12 reflects the processed green image onto the user's image recording medium 18. An appropriate exposure time for the processed image is achieved by enabling and blanking the monochrome CRT 40 and/or opening and closing the focal plane shutter (not shown) located in front of the image recording medium 18. After the user's image recording medium 18 has been appropriately exposed to the processed green image, the user's image recording medium 18 is similarly exposed to a processed blue image and a processed red image. The user's image recording medium 18 is not advanced until the image recording medium 18 has been exposed to all three processed images.

Figure 6:
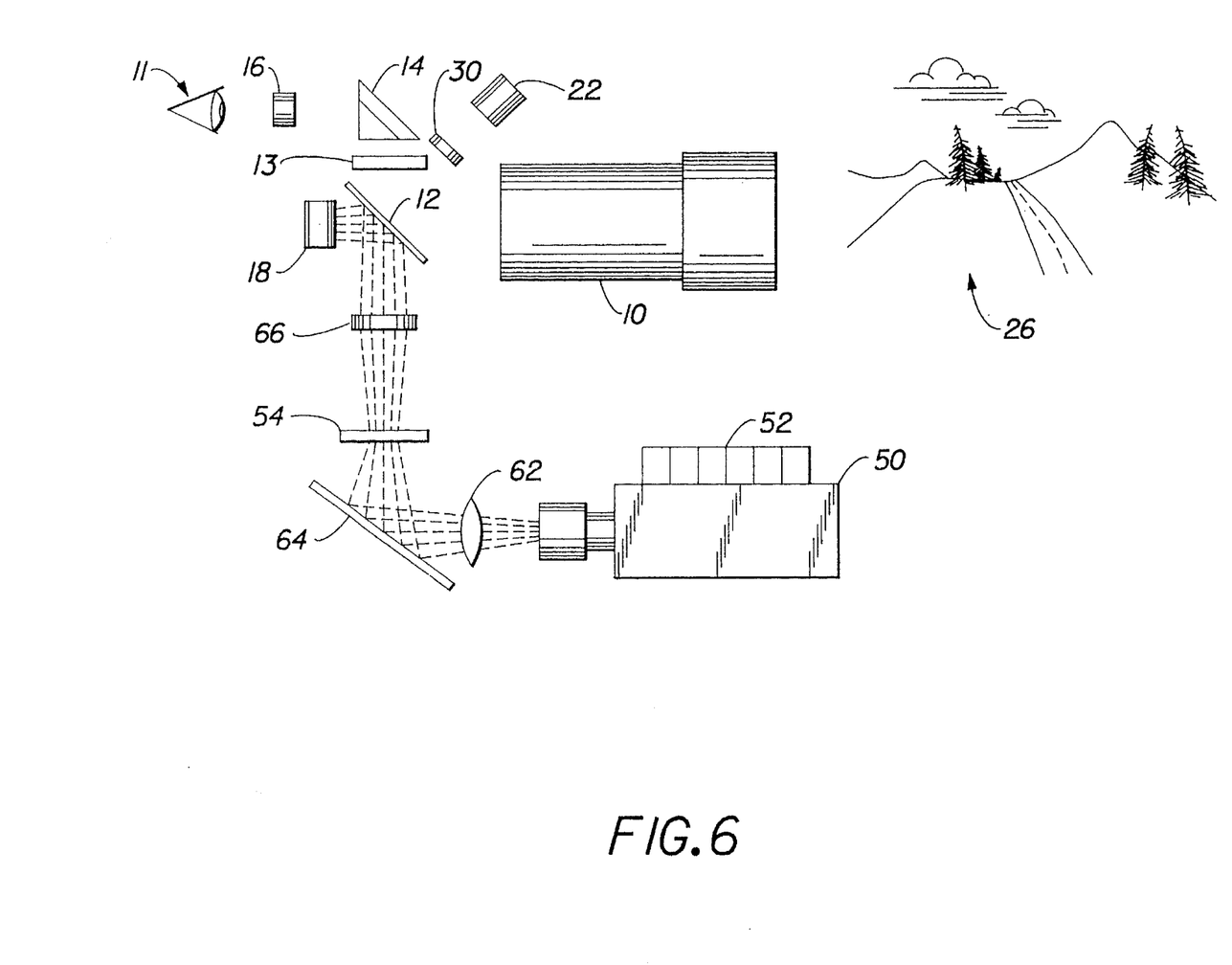
FIG. 6 is a side view of an image capture system according to the present invention without enclosures or supports, showing a projection device which includes a slide projector containing slides of the stored image or images.

With reference to FIG. 6, another embodiment of the system of the invention is shown where the projection device includes a slide projector 50 containing slides 52 of the stored image or images available for capture by a user on the user's image recording medium 18. For example, the Eastman Kodak Ektalite Model 1000 can be used. In this embodiment, when a user initiates an image capture action, the control mechanism (not shown) commands the slide projector 50 to project the stored image, as indicated by the optic ray bundle 62, via a folding mirror 64 on to a ground glass screen 54 which serves to focus the projected stored image through a relay lens 66 for re-imaging the stored image on the image recording medium 18 via a tilting mirror 12. In the preferred embodiment where multiple stored images are available for capture, the control mechanism (not shown) commands the slide projector 50 to project the slide 52 containing the stored image being viewed by the user when the user initiates the image capture action. The stored image is then captured on the user's image recording medium 18. For example, the user's photographic film can be appropriately exposed to the stored image by enabling the slide projector 50 and opening and closing the focal plane shutter (not shown) located in front of the film.

The foregoing description of the present invention has been presented for purposes of illustration and description. Furthermore, the description is not intended to limit the invention to the form disclosed herein. Consequently, variations and modifications commensurate with the above teachings, and the skill or knowledge of the relevant art, are within the scope of the present invention. The embodiments described herein are further intended to explain best modes known for practicing the invention and to enable others skilled in the art to utilize the invention in such, or other, embodiments and with various modifications required by the particular applications or uses of the present invention. It is intended that the appended claims be construed to include alternative embodiments to the extent permitted by the prior art.

| ELEMENTS IDENTIFIED BY REFERENCE NUMERAL | |
| --- | --- |
| Reference Numeral | Element |
| 10 | objective lens |
| 11 | user |
| 12 | tilting mirror |
| 13 | viewing screen |
| 14 | roof pentaprism |
| 16 | eye piece lens |
| 18 | image recording medium |
| 22 | display device |
| 26 | object of interest |
| 28 | optic ray bundle (FIG. 2) |
| 30 | relay lens for first display device |
| 32 | projection device |
| 34 | relay lens for monochrome CRT |
| 40 | monochrome CRT |
| 42 | filter wheel |
| 44 | red filter |
| 46 | blue filter |
| 48 | green filter |
| 50 | slide projector |
| 52 | slides |
| 54 | ground glass screen |
| 56 | optic ray bundle (FIG. 3) |
| 58 | optic ray bundle (FIG. 4) |
| 60 | optic ray bundle (FIG. 5) |
| 62 | optic ray bundle (FIG. 6) |
| 64 | folding mirror for slide projector |
| 66 | relay lens |

What is claimed is:

1. An image capture system comprising:

(a) an image recording medium;

(b) means for viewing a real image;

(c) means for capturing said real image onto the image recording medium; and (d) means for capturing a stored image onto the image recording medium, comprising a projection device capable of projecting at least one stored image onto said image recording medium, wherein said projection device is selected from the group consisting of a CRT and a slide projector.

2. An image capture system according to claim 1, further comprising means for viewing a stored image.

3. An image capture system according to claim 2, wherein said image capture system further comprises means for viewing more than one stored image.

4. An image capture system according to claim 2, wherein said stored image is stored in a digital format.

5. An image capture system according to claim 2, wherein said means for viewing a stored image comprises a display device capable of displaying a stored image.

6. An image capture system according to claim 1, wherein said projection device comprises:

(a) a monochrome CRT, wherein said monochrome CRT sequentially projects a red, blue and green color separation of said at least one stored image; and (b) a rotating device comprising a red filter, a blue filter and a green filter, wherein said rotating device is positioned so as to cause each said projection of a stored image to pass through a corresponding filter.

7. An image capture system for use by the general public comprising:

(a) a viewing screen capable of displaying an image for viewing by a user;

(b) means for positioning an image recording medium capable of receiving a user's image recording medium;

(c) a tiltable mirror having a first reflective side and a second reflective side;

(d) a lens capable of projecting a real image onto a user's image recording medium, wherein said lens is also capable of projecting a real image onto said viewing screen by reflecting said real image off of the first side of said tiltable mirror;

(e) a display device capable of projecting a stored image onto said viewing screen by reflecting said stored image off of said first side of said tiltable mirror;

(f) a projection device capable of projecting a stored image onto an image recording medium by reflecting said stored image off of said second side of said tiltable mirror.

8. An image capture system according to claim 7, wherein said display device comprises a CRT.

9. An image capture system according to claim 7, wherein said display device comprises a liquid crystal display.

10. An image capture system according to claim 7, wherein said projection device is selected from the group consisting of: a CRT and a slide projector.

11. An image capture system according to claim 7, wherein said projection device comprises:

(a) a monochrome CRT, for separately projecting a red, blue and green color separation of a stored image; and (b) a rotating device comprising a red filter, a blue filter and a green filter, wherein said rotating device is positioned so as to cause a projection to pass through the filters.

\* \* \* \* \*